(12) United States Patent
Okholm et al.

(10) Patent No.: US 7,720,085 B1
(45) Date of Patent: May 18, 2010

(54) METHOD AND APPARATUS FOR CONTROLLING TRANSMISSION FLOW USING EXPLICIT RATE CONTROL AND QUEUING WITHOUT DATA RATE SUPERVISION

(75) Inventors: Jon Eric Okholm, Monte Sereno, CA (US); Saurabh Aggarwal, New Delhi (IN); Michael J. Quinn, Campbell, CA (US)

(73) Assignee: Packeteer, Inc., Cupertino, CA (US)

( * ) Notice: Subject to any disclaimer, the term of this patent is extended or adjusted under 35 U.S.C. 154(b) by 93 days.

(21) Appl. No.: 11/541,318

(22) Filed: Sep. 29, 2006

Related U.S. Application Data

(63) Continuation of application No. 10/140,351, filed on May 6, 2002, now Pat. No. 7,236,459.

(51) Int. Cl.
*H04L 12/54* (2006.01)
(52) U.S. Cl. .................. 370/429; 370/232; 370/412
(58) Field of Classification Search .................. None
See application file for complete search history.

(56) References Cited

U.S. PATENT DOCUMENTS

| | | |
|---|---|---|
| 5,042,029 A | 8/1991 | Hayakawa |
| 5,193,151 A | 3/1993 | Jain |
| 5,251,152 A | 10/1993 | Notess |
| 5,359,593 A | 10/1994 | Derby |
| 5,426,635 A | 6/1995 | Mitra |
| 5,455,826 A | 10/1995 | Ozveren |
| 5,495,426 A | 2/1996 | Waclawsky |
| 5,802,106 A | 9/1998 | Packer |
| 5,838,919 A | 11/1998 | Schwaller |
| 5,870,561 A | 2/1999 | Jarvis |
| 5,923,849 A | 7/1999 | Venkatraman |
| 6,018,516 A | 1/2000 | Packer |
| 6,038,216 A * | 3/2000 | Packer .................. 370/231 |
| 6,046,980 A | 4/2000 | Packer |
| 6,047,322 A | 4/2000 | Vald |
| 6,075,791 A | 6/2000 | Chiussi |
| 6,115,357 A | 9/2000 | Packer |
| 6,119,235 A | 9/2000 | Vaid |
| 6,178,448 B1 | 1/2001 | Gray |
| 6,198,722 B1 | 3/2001 | Bunch |
| 6,205,120 B1 | 3/2001 | Packer |

(Continued)

OTHER PUBLICATIONS

Balakrishnan, H., et al., "Improving TCP/IP Performance Over Wireless Networks", Proc. of 1.sup.st AMC Conf. on Mobile Computing and Networking, Berkeley, CA, pp. 1-10 (Nov. 1995).

(Continued)

*Primary Examiner*—Chi H Pham
*Assistant Examiner*—Mohammad S Adhami
(74) *Attorney, Agent, or Firm*—Baker Botts L.L.P.

(57) ABSTRACT

Packet flow rate control techniques are enhanced by the interactive and early invocation of packet queuing to control short flows of packets and to eliminate undershoot and overshoot of a targeted flow rate. Packet queuing involves the scheduled release of packets in accordance with flow policies (priorities) to achieve a pre-selected outgoing target flow rate. The combination of controlled packet queuing and packet flow rate control with appropriate mechanisms for favoring one over the other improves the efficiency of data transmission.

7 Claims, 3 Drawing Sheets

U.S. PATENT DOCUMENTS

| | | | |
|---|---|---|---|
| 6,215,769 | B1 | 4/2001 | Ghani |
| 6,252,851 | B1* | 6/2001 | Siu et al. ............... 370/236 |
| 6,256,317 | B1 | 7/2001 | Holloway |
| 6,272,131 | B1 | 8/2001 | Ofek |
| 6,285,658 | B1 | 9/2001 | Packer |
| 6,298,041 | B1 | 10/2001 | Packer |
| 6,560,243 | B1 | 5/2003 | Mogul |
| 6,894,974 | B1* | 5/2005 | Aweva et al. ............ 370/230.1 |
| 6,928,052 | B2 | 8/2005 | Packer |
| 6,957,267 | B2* | 10/2005 | Awasthi .................. 709/232 |
| 2002/0159396 | A1 | 10/2002 | Carlson |
| 2002/0172153 | A1 | 11/2002 | Vernon |
| 2003/0097461 | A1 | 5/2003 | Barham |
| 2003/0195922 | A1* | 10/2003 | Andrews et al. ........... 709/202 |

OTHER PUBLICATIONS

Gong et al., "Study of a two level flow control scheme and buffering Strategies", INFOCOM '94 Networking for Global Communications, 13 .sup.th Proceedings IEEE (94CH3401-7), vol. 3, pp. 1124-1233 (Jun. 1994).

"10 Protocol Layering", TCP/IP, vol. I, pp. 139-144 (1991).

RFC 793, "Transmission Control Protocol—DARPA Internet Program Protocol Specification", Postel, ed., pp. 1-87 (1981).

RFC 1122, "Requirements for Internet Hosts", Branden, ed., pp. 1-116 (1989).

Roberts, L. G., "Explicit Rate Flow Control", lroberts@ziplink.net;http://www.ziplink.net/lroberts/Ex...ate/ Explicit-Rate-Flow-Control.htm, pp. 1-14 (Apr. 1997).

Thomas, S.A., "IPng and the TCP/IP Protocols", John Wiley & Sons, Inc., pp. 239-240, 1996.

"20.3 Sliding Windows", TCP/IP Illustrated, vol. 1, pp. 280-284 (1991).

"TCP: Flow Control and Adaptive Retransmission", TCP/IP, vol. II, pp. 261-283 (1991).

"2.5 The Idea Behind Sliding Windows", TCP/IP, vol. 1, pp. 175-177 (1991).

"12.10 Variable Window Size and Flow Control", TCP/IP, vol. 1, pp. 182-194 (1991).

Comer et al., "A Rate-Based Congestion Avoidance and Control Scheme for Packet Switched Networks," $10^{th}$ Int'l Conference on Distributed Computing Systems, IEEE Computer Society Press, Los Alomitos CA (1990).

Dighe et al., "Congestion Avoidance Strategies in Broadband Packet Networks," Proceedings vol. 1, IEEE Infocom '91 (1991).

Finn Arve Aagesen, "A Flow Management Architecture for B-ISDN," Integrated Broadband Communication Networks and Services (1993).

Chakrabarti et al., "Adaptive Control for Packet Video," Proceedings of the Int'l Conference on Multimedia Computing and Systems, IEEE Computer Society Press (1994).

Bolot et al., "A Rate Control Mechanism for Packet Video in the Internet," Proceedings vol. 3, IEEE Infocom '94, IEEE Computer Society Press (1994).

Hong et al., "Performance Evaluation of Connectionless Packet Service for ATM Networks," Proceedings IEEE Global Telecommunications Conference (Globecom '95) (1995).

Kanakia et al., "An Adaptive Congestion Control Scheme for Real-Time Packet Video Transport," SIGCOMM'93 Conference Proceedings, Computer Communication Review (1993).

Song et al., "An Algorithm for Flow and Rate Control of XTP," Technical Program Conference Record vol. 1/3, IEEE Int'l Conference on Communications '93 (1993).

Gerla et al., "Comparing ATM Credit-Based and Rate-Based Controls for TCP Sources," MILCOM 95, Univesal Communications, Conference Record, IEEE, Part vol. 1, 1995, pp. 6-10 vol. 1 New York, NY.

V. Jacobson. Congestion avoidance and control. In ACM SIGCOMM '88, vol. 18, 4, pp. 314-329 (1988).

Huynh et al. Performance Comparison Between TCP Slow-Start and a New Adaptive Rate-Based Congestion Avoidance Scheme. Proceedings of the $2^{nd}$ Int'l Workshop on Modeling, Analysis, and Simulation of Computer and Telecommunications Systems, IEEE 1994.

Zygmunt Haas. Adaptive Admission Congestion Avoidance Control. Computer Communications Review, vol. 21, No. 5, pp. 58-76. ACM SIGCOMM, 1991.

Ramakrishnan et al. A Binary Feedback Scheme for Congestion Avoidance in Computer Networks. ACM Transactions on Computer Systems, vol. 8, No. 2, pp. 158-181. May 1990.

Choi et al. On Acknowledgment Schemes of Sliding Window Flow Control. IEEE Transactions on Communication, vol. 37, No. 11 (1989).

Huan-Yun Wei; TcpMasq—"Active Bandwidth Management System" Open Source; URL http://www.cis.nctu.edu.tw/~gis87517; Pointer=Publication as of May 8, 2002.

* cited by examiner

METHOD AND APPARATUS FOR CONTROLLING TRANSMISSION FLOW USING EXPLICIT RATE CONTROL AND QUEUING WITHOUT DATA RATE SUPERVISION

CROSS REFERENCE TO RELATED APPLICATIONS

This continuation application claims the benefit of U.S. patent application Ser. No. 10/140,351 filed on May 6, 2002 now U.S. Pat. No. 7,236,459, which is incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to digital packet telecommunications, and particularly to management of flow of data, that is, the volume of data per unit of time across heterogeneous network boundaries. It is particularly useful in a digitally-switched packet telecommunications environment normally not subject to data flow rate control. The present invention is intended to work in an environment having a metered-release of acknowledgements and a window control mechanism.

This invention represents an augmentation of the capabilities disclosed in the work of Robert Packer, as for example described in U.S. Pat. Nos. 6,018,516; 5,802,106; 6,038,216; 6,046,980; 6,205,120; 6,285,658; 6,298,041 and 6,115,357. The Packer packet flow rate control mechanisms taught therein controlled size of the sliding window, amount of acknowledged data and timing of acknowledgement delivery.

The ubiquitous TCP/IP protocol suite intentionally omits explicit supervision of the rate of data transport over the various media which comprise a network. While there are certain perceived advantages, this characteristic of TCP/IP has the consequence of juxtaposing very high-speed packet flows and very low-speed packet flows in potential conflict for network resources, which results in inefficiencies. Certain pathological loading conditions can result in instability, overload and data transfer stoppage. Therefore, it is desirable to provide some mechanism to optimize efficiency of data transfer while minimizing the risk of data loss. Data flow rate capacity information is a key factor for use in resource allocation decisions.

The technology of interest is based largely on the TCP/IP protocol suite, where IP, or Internet Protocol, is the network layer protocol and TCP, or Transmission Control Protocol, is the transport layer protocol. At the network level, IP provides a "datagram" delivery service. By contrast, TCP builds a transport level service over the datagram service to provide guaranteed, sequential delivery of a byte stream between two IP hosts.

Conventional TCP flow control mechanisms operate exclusively at the end stations to limit the rate at which TCP endpoints emit data. However, TCP lacks explicit data rate control. In fact, until the work of Packer, there was no concept of coordination of data rates among multiple flows.

The basic TCP flow control mechanism is a sliding window superimposed on a range of bytes beyond the last explicitly-acknowledged byte. Its sliding operation limits the amount of unacknowledged transmissible data that a TCP endpoint can emit.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e., if an acknowledgment is not received within (typically) the smoothed RTT+4*mean deviation, then packet loss is inferred and the data pending acknowledgment is retransmitted.

Data rate flow control mechanisms which are operative end-to-end without explicit data rate control draw a strong inference of congestion from packet loss (inferred, typically, by RTO). TCP end systems, for example, will 'back-off', i.e., inhibit transmission in increasing multiples of the base RTT average as a reaction to consecutive packet loss.

While TCP rate control has significant advantages, there are certain conditions where the response time needed to adjust rate control mechanisms is less than can be provided by Packer packet flow rate control techniques.

SUMMARY OF THE INVENTION

According to the invention, in a packet-based communication system where acknowledgment packets are employed in the control of the flow rate of packets, packet flow rate control techniques are enhanced by the interactive and early invocation of packet queuing to control short flows of packets and to eliminate overshoot of a targeted flow rate. Packet queuing according to the invention may involve the scheduled release of packets in accordance with flow policies (priorities) to achieve a preselected outgoing target flow rate. In a specific embodiment of the invention, packets that arrive from a data source at the beginning of a flow before rate control is effective, the packets are forwarded by metering them out at the allocated bandwidth below the bandwidth capacity of the channel based on an expected capacity of the channel. The queuing of packets terminates and the queue is emptied as the feedback-based rate control mechanism using acknowledgments begins to moderate the rate of packet release from the data source. Packet rate control uses window size (TCP window size), acknowledgment rate, and number of bytes acknowledged. The combination of controlled packet queuing and network flow rate control with appropriate mechanisms for favoring one over the other improves the efficiency of data transmission.

The invention will be better understood by reference to the following detailed description in connection with the accompanying drawings.

DETAILED DESCRIPTION OF THE INVENTION

Figure 1:
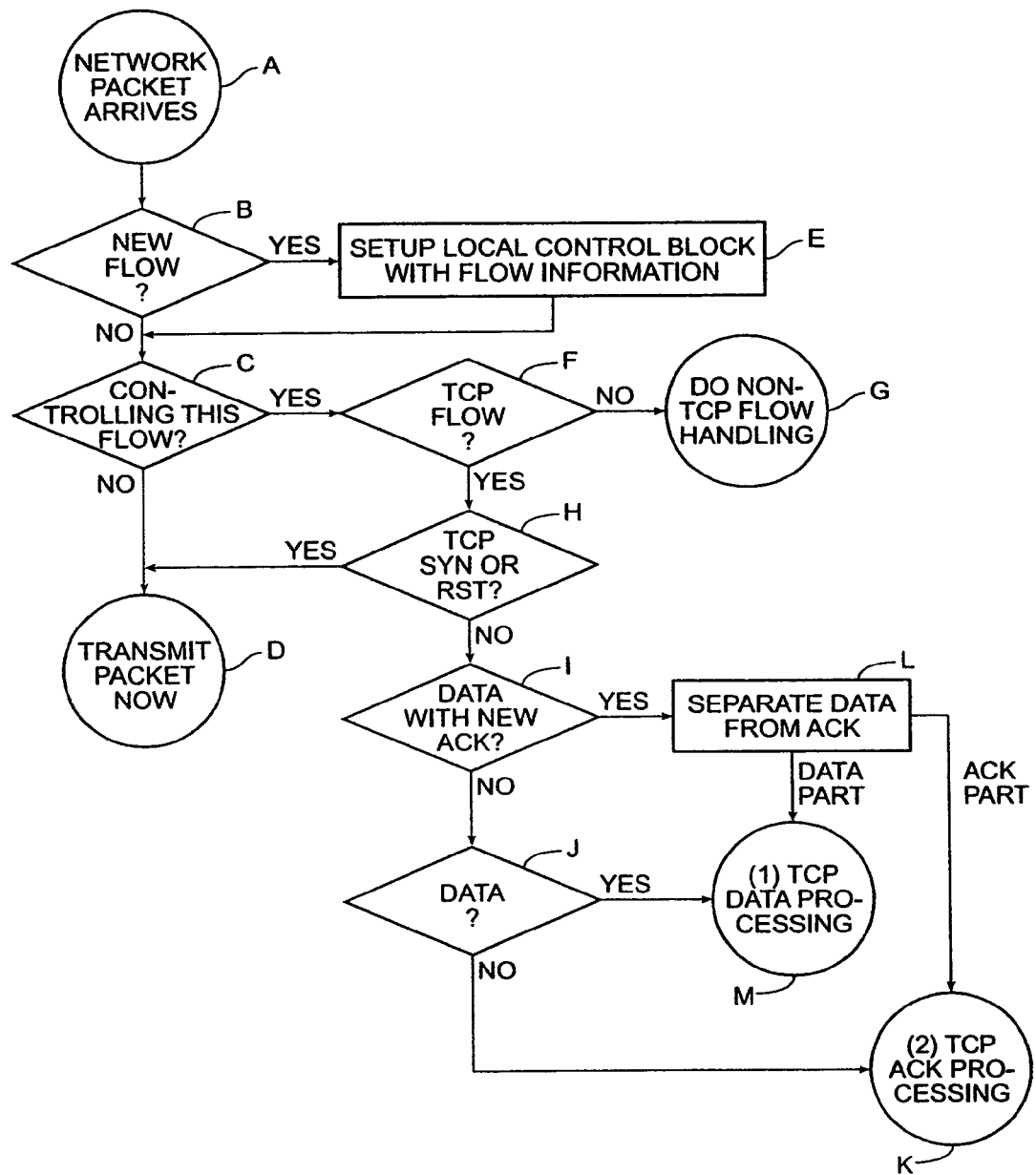
FIG. 1 is first flow chart of operation of an integrated packet rate control mechanism according to the invention.

Referring to FIG. 1, a flow chart is shown of overall or integrated system operation of a controller at a portal in the flow path between an arbitrary data source and an arbitrary data destination according to the invention. The invention is explained in the context of Transmission Control Protocol (TCP), which is a well-known transmission protocol used on the Internet. However, in general any network protocol or network application which employs a feedback mechanism to moderate bandwidth allocated to a source can be rate controlled through an implementation of this mechanism. Network transport protocols that fall into this category include AppleTalk ADSP, AppleTalk ATP, some sub-protocols of SNA, SNA/IP, and RTP/IP. Some applications with explicit timing feedback, such as Real Audio over UDP, can also be controlled with a specific implementation of the described mechanism.

In the protocol, a network packet arrives at the controller (Step A) and is immediately tested to determine if it is a new flow (Step B). If not, the packet is passed through, where it is subsequently check to determine if this flow is controlled or not (Step C). (A control block for this flow may be retrieved at this point to facilitate control.) If not, the packet is transmitted on in the network (Step D). The controller is thus transparent to the packet.

If the flow (Step B) is a new flow, then the controller sets up a local control block with flow information for this new flow, such as source and destination IP addresses and TCP ports of the flow, as well as the state of the flow (e.g., time of receipt of packet, time of last packet received, ACK number, Sequence number, last ACKs, and window size) (Step E), and then the controller checks to see if flow is to be controlled (Step C).

If flow is to be controlled, the controller determines whether it is a TCP flow (Step F). If not, then the flow control is passed on to other control mechanisms appropriate to the flow type (Step G), and which are not a part of this specific embodiment.

If it is a TCP flow, then the controller checks to determine if a TCP SYN (synchronization) flag or RST (reset) flag set (Step H), in which case, the packet is passed to the network. Otherwise, the packet is tested to determine whether it contains data with a new ACK number (an ACK which has not been received before) (Step I). If not, it tested for data (Step J) and if not, it is passed on for normal TCP ACK processing (Step K, FIG. 3).

If the packet contains both data and new ACK information, then the data and the ACK are separated (Step L). this is done as follows. A new packet is created with no data, and the new ACK information is copied into the new packet. This new packet is forwarded for normal TCP ACK processing (Step K). The data packet is stripped of the new ACK information (the acknowledgment number in the TCP is set back to the last acknowledgment number that was forwarded in this direction), and the packet, which now contains only data, is forwarded to TCP data processing (Step M, FIG. 2). By separating the data from the ACK, the data can be forwarded as soon as possible without regard to the timing of the forwarded ACK packets that are metering the sender's data transmission rate.

Figure 2:
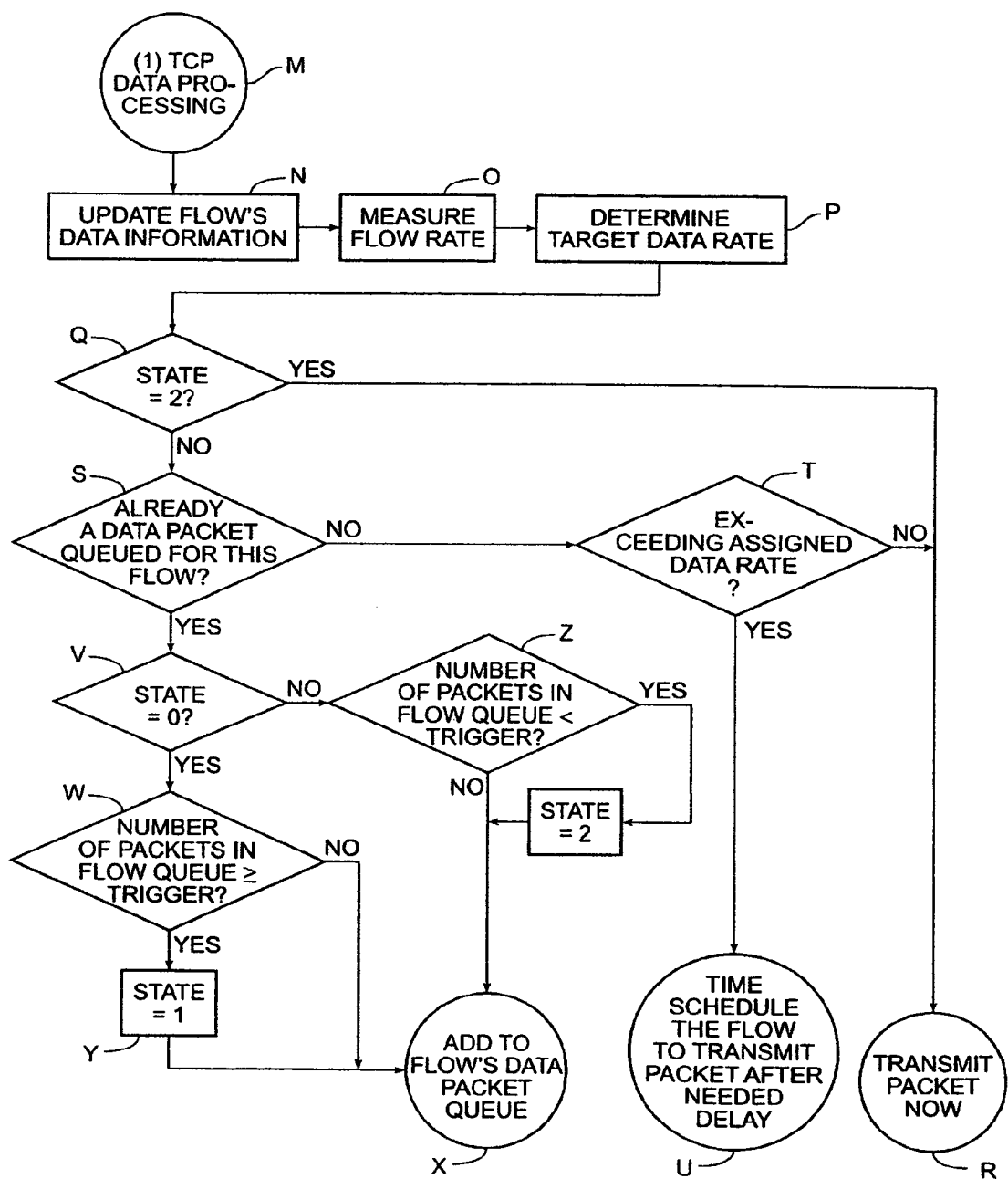
FIG. 2 is a second flow chart of operation of an augmented packet rate control mechanism in FIG. 1 according to the invention.

Referring to FIG. 2, with the environment set up to take advantage of the invention, the local control block for the flow is augmented and updated (Step N) by recording the highest sequence number (SEQ) received, checking for missing data according to missing sequence numbers, and recording the time of arrival of the packet at the controller. Then in Step O, a new estimate of the flow's data rate is made. This is done by updating an Exponentially Weighted Moving Average (EWMA) with the latest flow rate measurement. The latest flow rate measurement is the number of bytes in the packet received divided by the interval since the receipt of the last received packet. This value is the measured flow rate. Thereafter the controller determines the target data rate (Step P) by making a new estimate of the flow's potential rate (whether to increase or decrease), requesting bandwidth from the distribution mechanism (not shown), and receiving from the bandwidth distribution mechanism an assignment of bandwidth or target rate in bytes per second. The target rate is acquired on every incoming packet, since the target rate information is used in subsequent control steps.

The state of the initial packet in a flow is State 0 (zero) of possible states 0, 1 and 2. The states indicate whether a queue is on buildup, draindown or whether the queuing mechanism is finished. This queuing process is typically not used after an initial period related to the beginning of a new flow or a restart of a flow after a pause.

If the tested packet has achieved a state equal to 2 (Step Q), then there will be no queuing, and the packet is transmitted without undue delay (Step R). If the state is zero or 1, then the controller tests to see if there is already a packet queued for this flow (Step S). If not, then the controller tests to determined whether the packet's inbound arrival rate exceeds the assigned target rate (Step T) (as determined by Step P). If not, the packet is transmitted (Step R). If its rate exceeds the target rate, then it is scheduled for delayed release (Step U), and it is released as scheduled.

If there is a data packet already queued for flow (Step S), then the state flag is again tested for State 0 or 1, to determine the state of the queue (Step V). If the state is zero (queue buildup), then the controller tests to see if the number of packets in the queue is greater than a trigger level, as selected by the operator (Step W). (In TCP where the target rate is not more than an order of magnitude different than the incoming rate, a queue of 2-4 is expected to be sufficient). If the queue is not "full," the packet is added to the queue (Step X), and the packet is dealt with as part of the scheduled release of the queue (the next transmission of a packet in the previous scheduling performed in of Step U). However, if the packet count exceeds the trigger, the state is set to State 1 (Step Y) before the packet is added to the queue (Step X).

If the state is State 1 (Not State=0, Step V), the queue is in draindown state, whether or not it is being emptied. The controller checks to see if the number of packets in the queue has fallen below a draindown trigger level (Step Z). The draindown trigger level may be different than the buildup trigger level. If not, then the packet is added to the queue (Step X). Otherwise, the state is set to 2 (Step AA) before adding the packet to the queue. State 2 indicates that the queuing is done. Packets are released from the queue in due course through the scheduling of transmission.

Figure 3:
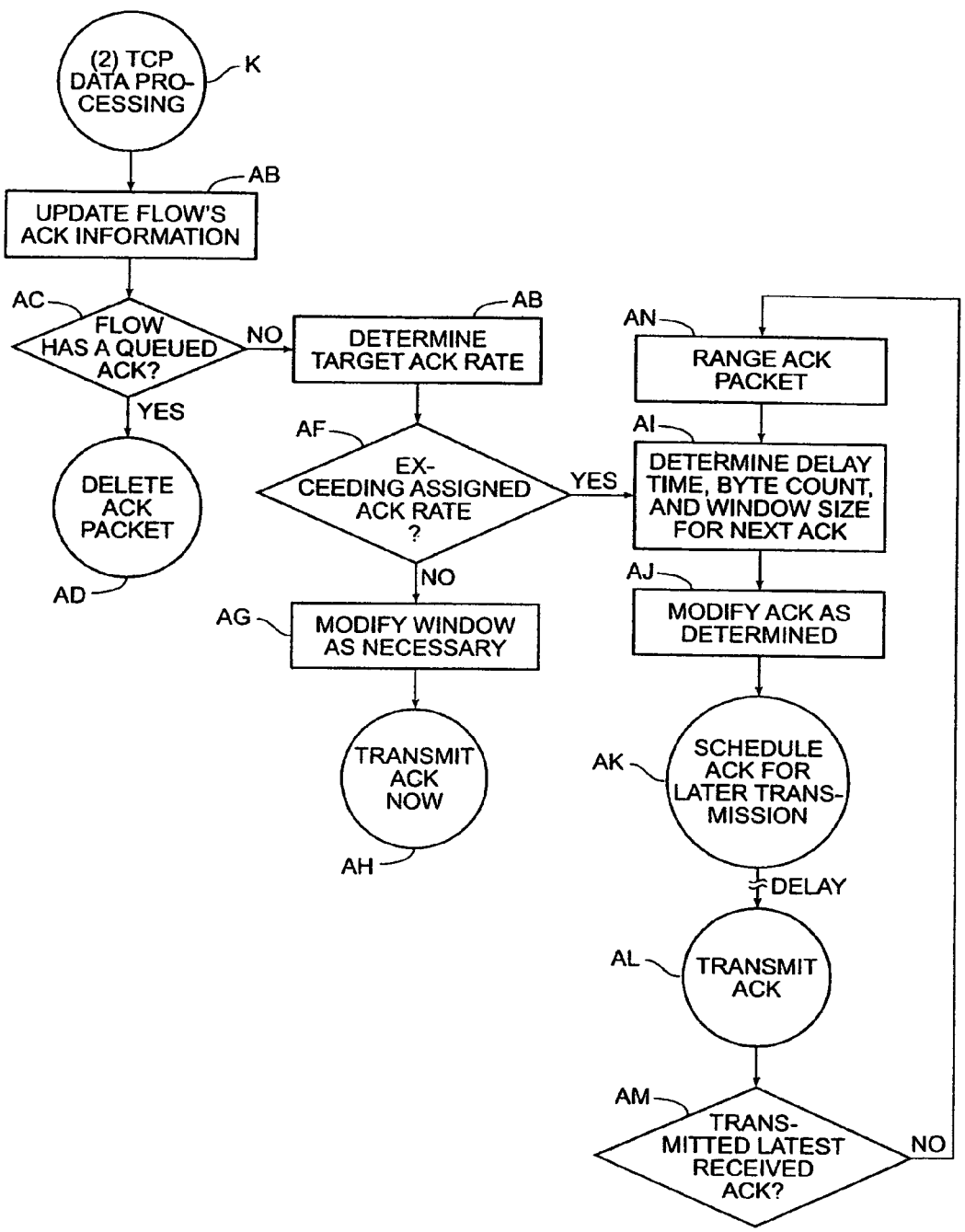
FIG. 3 is a third flow chart of operation of a normal rate control and sizing mechanism in FIG. 1 according to the invention.

Referring now to FIG. 3, the mechanism for rate control with Acknowledgment is illustrated. This process takes over from the queuing mechanism, which is the initial rate control mechanism, after the decisions of the controller outlined in FIG. 1 are completed. The ACK packet (Step K) prompts the updating of the ACK information of the flow's control block (Step AB) and tests to determine whether there is an ACK which has been queued (Step AC). If there is already an ACK for this flow that has been scheduled for future release, then the current ACK is simply deleted (Step AD), and the controllers wait for the next timed ACK transmission or release. If there is not an ACK in the system, this ACK packet is used to determine data rates and ACK rates (Step AE). This is done by dividing the number of bytes acknowledged between the time of receipt of the current ACK and time of receipt of a previous ACK. This rate may be averaged over several ACK times using the EWMA technique mentioned previously.

The ACK rate is then tested (Step AF). If the ACK rate does not exceed the assigned ACK rate as specified by the bandwidth manager (Step T, which is based on data flow rate), the window size is modified to be consistent with prior window sizes (Step AG) and the ACK is transmitted to the data source (Step AH). If the ACK rate does exceed the assigned ACK rate, then, since there is no scheduled ACK, the controller modifies the ACK to be consistent with the data rate assigned to the flow. the ACK may be modified by changing the number of bytes acknowledged by the packet (never sending an ACK that is less than previously sent ACKs), or it may reduce the advertised window size (which can be done by holding one edge of the window constant, since reducing the window from previous packets without advancing the acknowledgment number is a violation of the TCP protocol specification) (Step AI). The ACK may be and often is delayed in time. This time delay is useful in conjunction with ACK modifications to induce the data sender to send further data packets at the assigned data rate. Then the controller modifies the ACK packet according to the prior calculations (Step AJ), and schedules the ACK packet for later transmission (Step AK). After the scheduled delay, the ACK packet is transmitted (Step AL) and the controller checks to see if all bytes which have been acknowledged by the receiver have been forwarded to the sender (Step AM). If so, the process is done. Otherwise, the ACK is recycled (Step AN) and new determinations are made of delay, byte count and window size (Step AI) in according with the acknowledgment-based rate control mechanism.

The combination of initial queuing of packets and Acknowledgment-based rate control provides an effective mechanism for introduction of new flows in a bandwidth limited packet transmission environment, where speeds need to be controlled. It is most useful in an environment where fast and slow rates must be merged, and it inhibits undesired effects manifest in traffic speed oscillation.

The invention has been explained with reference to specific embodiments. Other embodiments will be evident to those of ordinary skill in the art. It is therefore not intended that the invention be limited, except as indicated by the appended claims.

What is claimed is:

1. In a digital data communication network employing packets for conveying information, a method for use at a controller between a data source and a data destination in a flow path for controlling flow of data, the method comprising:
   receiving, at the controller, a data packet of a Transport Control Protocol (TCP) data flow from a data source;
   queuing, the data packet of the TCP data flow on a queue and subsequently transmitting the data packet at a scheduled delay to achieve a target rate for the TCP data flow, if a measured rate of the TCP data flow exceeds the target rate or a prior packet of the data flow is stored on the queue;
   entering a queue drain-down phase when a first threshold number of packets of the TCP data flow are stored on the queue, wherein the queue drain-down phase comprises:
      queuing the data packet of the TCP data flow on a queue and subsequently transmitting the data packet at a scheduled delay to achieve a target rate for the TCP data flow, if a prior packet of the data flow is stored on the queue;
      bypassing, after entering the queue drain-down phase, the queuing step of the drain-down phase for subsequent packets of the TCP data flow when the number of packets of the TCP data flow stored on the queue falls below a second threshold number of packets; and
   controlling window size, amount of acknowledged data and timing of response of acknowledgments of data in the flow path between the data source and the data destination.

2. The method according to claim 1 wherein said queuing step is initiated immediately at the start of a TCP data flow.

3. The method according to claim 1, wherein the data packet comprises data, and wherein the method further comprises determining whether the data packet includes a new acknowledgment of data; and, if so, creating a first new packet including the data of the received packet and a second new packet including the new acknowledgment of data; and applying separate processing to the first and second new packets.

4. The method according to claim 1 wherein the first and second threshold are the same.

5. The method according to claim 3 further comprising modifying one or more attributes of the acknowledgment of data corresponding to the second new packet.

6. The method according to claim 5 wherein the modifying step comprises one or more of: modifying an advertised window size, modifying an amount of data acknowledged, and queuing the second new packet for a scheduled delay.

7. The method of claim 1 wherein synchronization or reset packets are scheduled for immediate transmission.

* * * * *